March 14, 1972 H. J. JORDAN ET AL 3,649,366
STORAGE BATTERY AND HEATER THEREFOR
Filed Feb. 19, 1970 2 Sheets-Sheet 1

INVENTORS.
HOWARD J. JORDAN
ROGER S. NIEBES

INVENTORS.
HOWARD J. JORDAN
ROGER S. NIEBES

United States Patent Office 3,649,366
Patented Mar. 14, 1972

3,649,366
STORAGE BATTERY AND HEATER THEREFOR
Howard J. Jordan, Cleveland, and Roger S. Niebes,
Mentor, Ohio, assignors to ESB Incorporated
Filed Feb. 19, 1970, Ser. No. 12,680
Int. Cl. H01m 45/02
U.S. Cl. 136—161
13 Claims

ABSTRACT OF THE DISCLOSURE

A storage battery whose container has heating elements formed on the external surfaces thereof. The heating elements are constructed and arranged for operation either from the vehicle power supply or from an external source.

BACKGROUND OF THE INVENTION

This invention relates to a heating device for vehicle batteries.

It is well known that the output of storage batteries deteriorates as the battery temperature is lowered. At low temperatures the ability of storage batteries to accept charge is less than at normal temperatures. It is also true that the electrical requirements placed upon the battery at low temperatures are often considerably more severe than at normal temperatures. For these reasons, battery failures occur more frequently at low temperatures than when the battery is warm. It has been found that if a battery is artificially heated at low ambient temperatures, it will be less apt to fail than if not so heated.

Several forms of battery heating devices have been described. In one form, the battery is mounted in an insulating box provided with a heater to keep the battery warm. In another form, heater elements are immersed in the battery electrolyte. In a third form, resistive wire heating elements are molded in the battery container walls. In a fourth form, a flexible insulated jacket with built-in heating elements is wrapped around the battery.

There are problems associated with each of these prior art constructions. Insulated boxes or blankets take up considerable room and interfere with proper maintenance of the battery. They are harmful to the battery when the temperature to the battery rises as they prevent proper cooling. Heaters immersed in the electrolyte take up room in the battery cell. It has been found in service that such heaters eventually fail due to break-down of electrical insulation.

Heating wires molded into the battery box have been troublesome because the wires tend to move out of position during the molding operation and either penetrate to the outside surface where they are liable to mechanical damage or are exposed to the inner surface where they are subject to attack from the electrolyte. Present day battery cases are very thin, particularly those made from thermoplastic materials such as polypropylene, and this thinness of material makes the accurate location of heater wires a very difficult technical problem.

SUMMARY OF THE INVENTION

In this invention, an electrically resistive heater is provided on the outside of the battery case such as by spraying a mixture of electrically conductive powder and binder to form a coating material in a suitable pattern or by securing or bonding a conductive foil to the container surface. The electrical properties of this resistive heating coating are determined by its length, width, thickness and the specific resistivity of the coating material. Suitable terminals for the heating strip are provided by cementing metal contact pieces to the container prior to applying the resistive strip. To form the electrical strip pattern, dams and masking pieces may be applied to the surface of the battery case. A protective coat may be sprayed or cemented over the conductive strip to prevent mechanical damage.

Because the battery case itself is a poor conductor of heat and because many battery case materials have comparatively low softening points, it is desirable to limit the heat input per unit of area. In order to supply sufficient total heat to the battery, it is therefore desirable to have the heater cover a substantial portion of the entire battery surface. In this respect, the present invention differs considerably from known heaters in which a wire heating element having high heat output per unit area is used. A limit of about ½ to about 10 watts per square inch has been found to be desirable.

Further, the area available for heating the two end cells of a multi-cell battery is in general greater than the area available to heat the center cells. Therefore, it has been found desirable to have the heating member extend over only part of the battery end walls.

Finally, the lower portion of the battery up to or slightly above the level of the plate tops contains electrolyte which is a good conductor of heat. Above this is the gas space. It will be seen that the heater area should not extend above the normal electrolyte level or even somewhat below this to prevent overheating of the battery case material above the electrolyte level.

DESCRIPTION OF THE PREFERRED EMBODIMENTS

Figure 1:
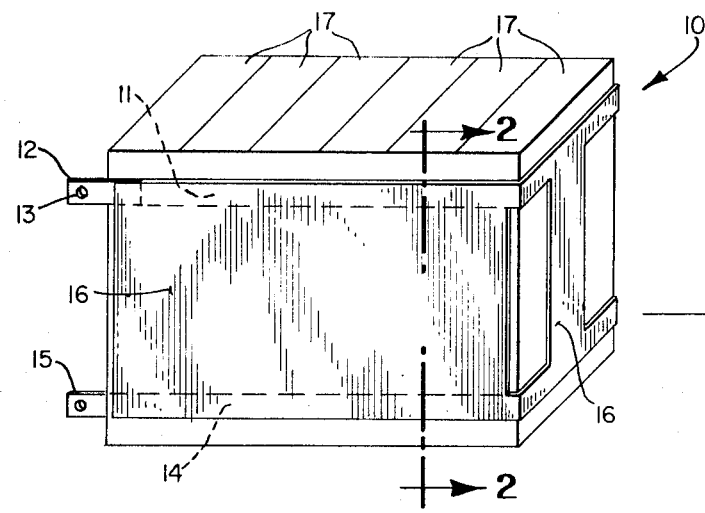
FIG. 1 is a front elevation view of a battery container having heating elements in accordance with this invention suitable for use with a relatively low voltage power source.

Referring in detail to FIG. 1, battery container 10 having multiple cell compartments 17 made of molded hard rubber or plastic material has a metallic foil conductor band 11 cemented to the container at the top of the desired heater area and extending around the two sides and two ends of the container. This conductor may be of any of the common metals with preference given to copper because of its high conductivity. There are a number of cements avialable for cementing metal to plastic or hard rubber among which are epoxy resins, rubber base cements, and various hot melt cements such as asphalt compositions. 12 is a metal terminal piece in electrical contact with one end of band 11. Its purpose is to provide a means for connecting the external power circuit to conductor band 11. Hole 13 is shown to provide a bolted connection. A second conductor band 14 similar to 11 and fastened in the same manner, is located near the base of the battery container. A terminal 15 similar to terminal 12 is attached to conductor band 14, preferably at the end of the band 14 that is not directly under the first terminal 13.

A resistive coating 16 covers substantially the entire front and back (not shown) of battery container 10 as well as partially covering the right and left (not shown) ends between the limits of conductor bands 11 and 14. It also extends over conductor bands 11 and 14 to provide maximum electrical contact. The resistive coating 16 forms an electrical heater element when electrical power from an external power supply or the battery itself is supplied to the coating whereby all of the cells in the battery container may be uniformly heated.

Figure 2:
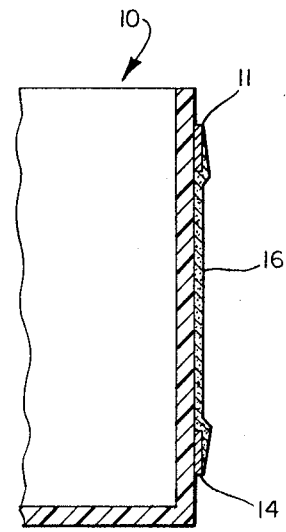
FIG. 2 is a sectional view taken along line 2—2 of FIG. 1.

FIG. 2 shows cross section 2—2 of battery container 10 with conductor bands 11 and 14 and resistive coating 16 covering the external surface of the container 10 and conductor bands 11 and 14.

The resistive coating is a conductive powder with or without a binder. It may be applied in a liquid form using a volatile carrier. A typical example without binder is colloidal graphite powder in water. An example with binder is colloidal graphite and dissolved polystyrene in toluene as solvent and carrier. Other powders that may be used are carbon, aluminum, copper, iron and nickel, and mixtures of these powders with graphite. There are also many other carrier, solvent and binder combinations which may be suitable.

Figure 3:
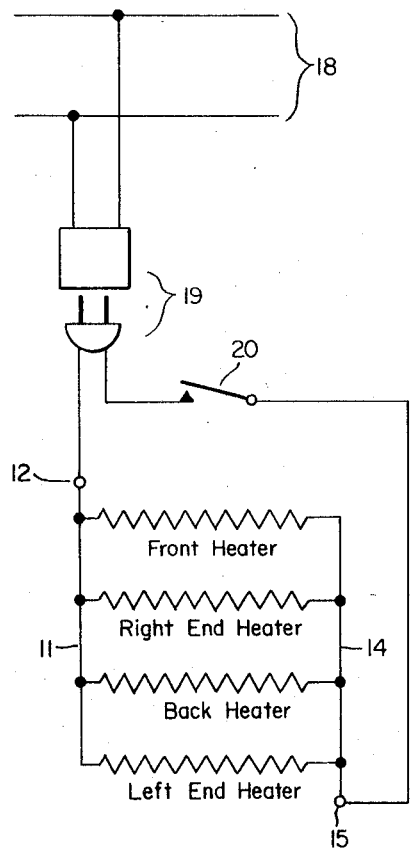
FIG. 3 shows an electrical wiring diagram of the battery heater depicted in FIG. 1 connected to a suitable power source.

The wiring diagram in FIG. 3 shows the electrical circuit for the heater shown in FIG. 1. In this figure, 18 represents an external power supply. 19 is an electrical disconnect plug so that the vehicle on which the battery is mounted may be separated from the power supply. 20 is a thermostatic switch located on the battery for controlling the amount of heat supplied to the cells of the battery by the heating element. Other reference numbers are common to FIG. 1.

Figure 4:
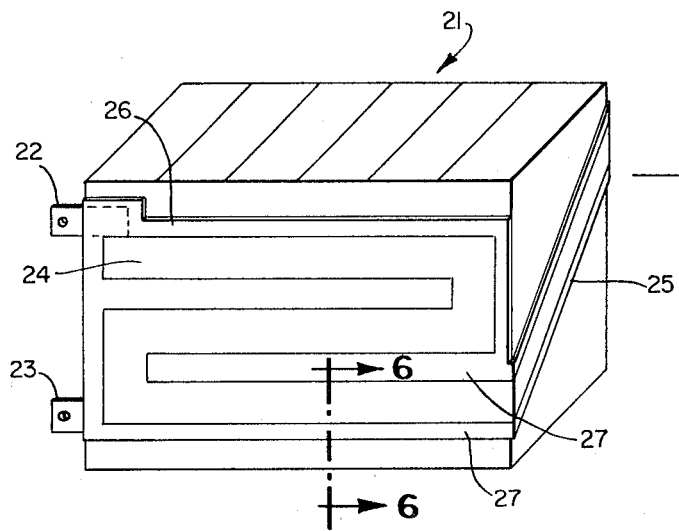
FIG. 4 is a front elevation view of a battery container having heating elements in accordance with this invention suitable for use with a relatively high voltage power source.
Figure 5:
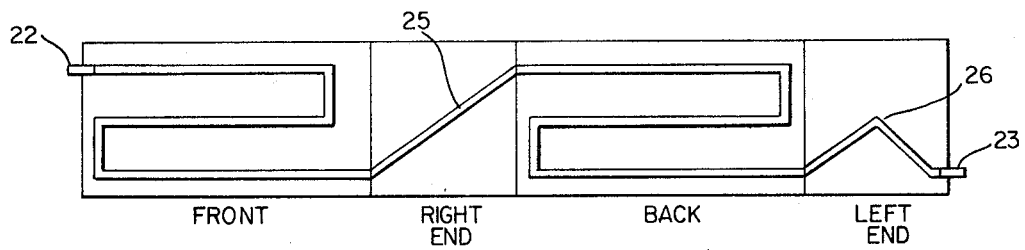
FIG. 5 is an expanded elevation view of the two sides and two ends of the battery container depicted in FIG. 4.

FIG. 4 shows a second embodiment of this invention. In this case, the heater is designed for operation at a considerably higher voltage than the heater shown in FIG. 1. In FIG. 4, 21 is the battery container. 22 is one metallic terminal fastened to the top left front of the container 21, and 23 is a second terminal fastened to the bottom left end of container 21. Resistive coating 24 makes three courses across the front of the container 21, and a single course 25 diagonally across the front hand end of the container. A similar pattern is continued on the back of container 21. However, in order to provide maximum electrical separation between terminals 22 and 23, the pattern of the resistive coating on the left end of container 21 is somewhat different than on the right end. In the case of the left end, in order to have the resistive coating meet terminal 23 and still have a length equal to that on the right end, it is shown as an inverted V shape. This is shown in FIG. 5 which gives in diagram form a projection of the two sides and two ends of the battery container 21. The diagonal shape of the right end heater 25 and the inverted V shape of the left end heater 26 are clearly shown in FIG. 5.

Figure 6:
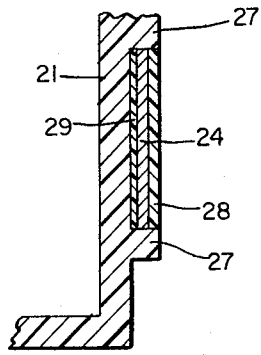
FIG. 6 is a sectional view taken along line 6—6 of FIG. 4.

FIG. 6 shows an enlarged cross section of FIG. 4 taken at 6—6. Continuous dams 27 are molded on the sides of container 21 and continuously delineate the extent of resistive strip 24.

Two further features of this embodiment are also shown in FIG. 6. The first is a protective layer 28 formed on the surface of resistive strip 24.

The resistive coatings, particularly those without a binder, are rather fragile. However, this weakness is overcome by the application of a protective top coat of varnish or paint. This should be compatible with the binder used in the resistive coat and should have good chemical resistance as well as mechanical strength. Epoxy resins are especially suitable for use as the protective coating. The final coating may be pigmented to increase its attractiveness. Depending upon the nature of the carrier and the protective coating, one or more heat setting or drying operations may be desirable to obtain the best properties. A second feature is a somewhat flexible layer 29 placed between container 21 and the resistive strip 24. This has been found desirable for reducing thermal strains between resistive strip 24 and container 21. Polyester film has been found suitable for this flexible layer.

The resistive coating may also take the form of a metal foil instead of a conductive powder composition. In this case, because of the lower resistivity of metals compared to the powder resistors described above, the general construction of the heater shown in FIG. 4 is more suitable than that of FIG. 1. A steel or steel alloy foil having a thickness of about .001 inch may be used. The foil is held in place with a suitable cement and protected with an overcoating of varnish. An epoxy resin material would be suitable for both purposes. Another resistive material suitable for battery heater service is conductive plastic sheet.

Figure 7:
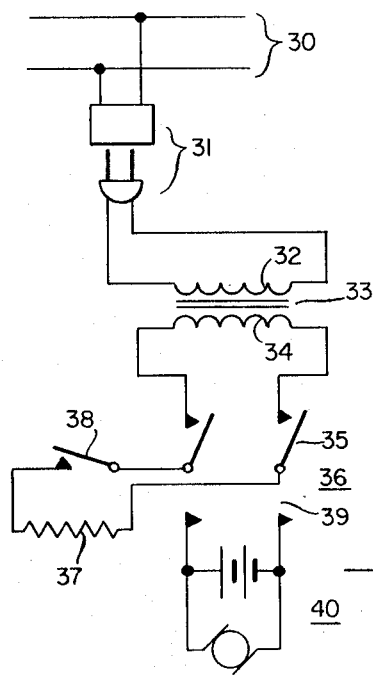
FIG. 7 shows an electrical wiring diagram of the battery heater depicted in FIG. 4 having two alternate power supplies.

In wiring diagram FIG. 7, a high voltage alternating current external power source 30 is led via disconnect plug 31 to primary winding 32 of step-down transformer 33. The secondary winding of this transformer 34 is connected to one side 35 of double throw switch 36 to battery heater 37 and thermostat switch 38. The other side 39 of double throw switch 36 is connected to the electrical circuit 40 of the vehicle on which the battery is mounted. The voltage of the secondary winding of transformer 34 is matched to be approximately the same as the voltage of the electrical circuit 40. By this means the battery can be heated from an external source while the vehicle is stationary to improve cranking power for starting the engine, and also maintain its heat during vehicle operation for best recharging ability.

EXAMPLE I

A commercially available colloidal graphite water dispersion containing approximately 64% water, 36% graphite powder (DAG FH–1373–36 Acheson Colloids Co.) was sprayed upon the sides and ends of a battery case provided with suitable terminals in such a way as to produce three heaters each approximately 30 inches long and 1½ inches wide and a thickness of approximately .0014 inch to give a resistance when all three heaters were connected in parallel of .98 ohm. The battery was cooled to —20° F. and the heaters connected to a 15 volt power source. Within 60 minutes the temperature of the inner cells had risen to 35° F. and the outer cells to 82° F.

Having fully described our invention, we claim:

1. In a storage battery comprising a container having at least one cell compartment with a cell element therein, the improvement comprising:
   (a) a heater comprising an electrically resistive coating bonded to substantial portions of the front and back of the battery container as well as to portions of the ends thereof, the output of the heater being between the limits of ½ and about 10 watts per square inch of heater surface; and
   (b) contact means for supplying electrical power to the heater.

2. A battery as in claim 1 in which the resistive heater comprises a metallic foil.

3. A battery as in claim 1 in which the resistive heater comprises a conductive powder secured to the container by an organic binder.

4. A battery as in claim 1 in which the resistive heater comprises a conductive powder having a protective coat of organic binder superimposed thereon.

5. A battery as in claim 1 in which the resistive heater comprises a conductive plastic sheet.

6. A battery as in claim 1 in which the ratio of heated area to unheated area on the end walls of the container is less than the ratio of heated area to unheated area on the front and back walls of the container.

7. A battery as in claim 1 in which the heater extends no higher than the height of the cell elements in each compartment.

8. A battery as in claim 1 in which the area of the heater associated with each cell compartment is sufficient to raise the temperature of each compartment to the same temperature level.

9. In a storage battery having a container, multiple cell compartments formed therein, an element in each cell compartment, said element comprising positive and negative plates and separators therebetween, and a liquid electrolyte in each cell compartment, the improvement comprising:
- (a) dams moulded on the external surface of the container defining a prescribed area on the container surface;
- (b) a heater comprising an electrically resistive coating covering and secured to the area delineated by said dams;
- (c) terminal means secured mechanically to said container and connected electrically to said resistive coating; and
- (d) the output of said resistive heater being within the range of about ½ and 10 watts per square inch of heater surface.

10. A battery as described in claim 9 in which a protective coating overlies the resistive coating.

11. A battery as described in claim 9 in which a layer of flexible material underlies the resistive coating.

12. In an apparatus for heating storage batteries mounted on a moveable vehicle, the improvement comprising:
- (a) a heater comprising an electrically resistive coating bonded to the external surface of the battery, the heater adapted to receiving power at a comparatively low voltage level;
- (b) a first source of power external to the vehicle operating at a comparatively high first source voltage;
- (c) a second source of power derived from the vehicle prime mover operating at a second comparatively low source voltage;
- (d) transformer means to convert the voltage of said first source to substantially that of said second source; and
- (e) transfer switch means for connecting said heater to said first source of power when the vehicle prime mover is not in operation and for connecting the heater to said second source when the prime mover is in operation.

13. An apparatus for heating storage batteries as described in claim 12 in which the output of the resistive heater is within the limits of ½ and 10 watts per square inch.

References Cited

UNITED STATES PATENTS

| | | | |
|---|---|---|---|
| 2,626,971 | 1/1953 | Mansoff | 136—161 |
| 2,678,990 | 5/1954 | Quirk | 219—543 |
| 3,067,310 | 12/1962 | Walz et al. | 219—543 |
| 3,156,813 | 11/1964 | Trainor | 136—161 |
| 3,177,341 | 4/1965 | Woody et al. | 219—543 |
| 3,349,722 | 10/1967 | Davis | 219—543 |

FOREIGN PATENTS

| | | | |
|---|---|---|---|
| 153,046 | 9/1953 | Australia | 136—161 |
| 1,557,516 | 2/1969 | France | 136—161 |

DONALD L. WALTON, Primary Examiner

U.S. Cl. X.R.

219—543